Patented Dec. 14, 1948

2,456,161

UNITED STATES PATENT OFFICE 2,456,161

PARAFORMALDEHYDE COMPOSITIONS

Joseph Frederic Walker, Staten Island, N. Y., assignor to E. I. du Pont de Nemours & Company, Wilmington, Del., a corporation of Delaware No Drawing. Application August 29, 1945, Serial No. 613,453

6 Claims. (Cl. 260—611.5)

This invention relates to paraformaldehyde compositions and method for producing the same. More particularly, it relates to paraformaldehyde having a high degree of reactivity and having an improved stability against loss of reactivity on storage.

Paraformaldehyde is a mixture of polyoxymethylene glycols, $HO \cdot (CH_2O)_n \cdot H$, containing from 93% to 99% formaldehyde, $CH_2O$, and in which the polyoxymethylene glycol molecules may contain from 8 to 100 formaldehyde units.

When first prepared, a polymer of this type has a low average molecular weight, but on standing polymerization takes place and the molecular weight increases. This change is indicated by a decrease in solubility and chemical activity as well as an increase in melting point. In 1932, Staudinger ("Die Hochmolekularen Organischem Verbindungen," pages 251-254, Berlin, Julius Springer) reported that a crude mixture of polyoxymethylene glycols obtained by cooling hot 80% formaldehyde contained a considerable quantity of low molecular weight polymer which was soluble in hot acetone. On standing in a desiccator, a polymer prepared in this manner decreased in solubility until it became completely insoluble in hot acetone. According to Staudinger's solubility measurements, this would indicate the disappearance of polymer molecules containing 12 or less formaldehyde units.

Commercial paraformaldehyde, as well as paraformaldehyde prepared in the laboratory by commonly employed methods, decreases in reactivity and solubility in water and other solvents, and increases in melting point, on storage. Many attempts have been made, heretofore, to slow up or prevent such loss of reactivity and solubility; however, such attempts failed to produce a satisfactory and practical method for slowing up or preventing the above-said decrease in reactivity of paraformaldehyde.

It is an object of this invention to provide a method for the production of paraformaldehyde having a high reactivity and an improved stability against loss of reactivity on storage.

It is another object of this invention to provide a new and improved paraformaldehyde composition.

Other objects of the invention will appear hereinafter.

The objects of this invention may be accomplished, in general, by dissolving a small quantity of pentaerythritol in an aqueous solution of formaldehyde, and converting the aqueous formaldehyde to paraformaldehyde by removal of water from the solution. The removal of water from the aqueous formaldehyde may be accomplished by vacuum distillation, evaporation at reduced pressure, or in any other desired manner readily apparent to one skilled in the art. The water may, for example, be removed by the addition of a nonmiscible liquid such as benzene or ethyl acetate to the aqueous formaldehyde solution, followed by distillation of a low-boiling azeotrope formed by the non-miscible liquid and the water. Preferably, the water is removed by vacuum distillation or evaporation at a pressure not to exceed 150 mm. Hg.

The product of this invention is a modified paraformaldehyde containing 0.1% to 10% of pentaerythritol, preferably 0.5% to 2.5 pentaerythritol. The preparation is carried out by dissolving pentaerythritol in an aqueous formaldehyde solution containing preferably 30% to 50% dissolved formaldehyde in such proportion that there is not less than one-half pound nor more than eighty pounds of pentaerythritol per one thousand pounds of formaldehyde. The resultant solution is then converted to modified paraformaldehyde by distillation or evaporation of water, preferably by vacuum evaporation.

The following examples illustrate preferred detailed processes for practicing the invention, it being understood that the scope of the invention is not limited to the specific details set forth therein.

*Example I*

Five parts of pentaerythritol were dissolved in one thousand parts of 37% formaldehyde solution. This solution was then placed in a distilling flask and subjected to vacuum distillation at a pressure of approximately 135 mm. This distillation was continued until approximately three hundred parts of solid paraformaldehyde was left in the distillation flask. This material was then removed from the flask and ground to a fine powder. Analyses indicated that this polymer contained 93.3% combined formaldehyde and melted in the temperature range 128–136° C. After sixty days' storage at room temperature the melting range of this material was 128–138° C. A similar product prepared from formaldehyde solution to which no pentaerythritol had been added was found to contain 93.9% by weight combined formaldehyde and melted in the range 148–153° C. After sixty days the latter sample melted at 166–176° C. These findings indicate that the paraformaldehyde modified with the pentaerythritol possesses a lower average molecular weight than the unmodified product and, at the same time, shows little tendency to undergo further polymerization on storage.

Reactivity measurements were made on the above polymer by determining its glue coagulation values. This value was determined by adding 5 grams of the formaldehyde polymer suspended in 7 cc. of water to a glue solution containing 50 grams of a high grade, commercial, flake glue and 2.75 grams of oxalic acid in 105 cc. of distilled water maintained at 60° C. The glue solution containing the formaldehyde polymer was agitated occasionally until the glue was coagulated. The coagulation time at 60° C. expressed in minutes is taken as the "glue coagulation value." This method of determining the reactivity of formaldehyde polymers is described by Browne and Hrubesky in the Journal of Industrial and Engineering Chemistry, vol. 19, page 218 (1927).

The following table indicates the difference between the modified sample of paraformaldehyde and the control containing no pentaerythritol:

|  | Glue Coagulation Value After— | | |
|---|---|---|---|
|  | 0 Days | 30 Days | 60 Days |
| Modified Product | 18 | 25 | 25 |
| Unmodified Product | 28 | 37 | 44 |

The properties of the above-described modified paraformaldehyde were also studied by measuring its rate of solution in water adjusted to a pH of 4. In this procedure, 5 grams of the polymer were agitated with 25 cc. of a buffer solution consisting of a mixture of N/10 solutions of sodium formate and formic acid adjusted to a pH of 4. Agitation was continued for two hours at 35° C. by rotating samples in sealed one-inch by six-inch test tubes at four revolutions per minute in a constant temperature bath. The mixture in the test tube was then filtered and the filtrate analyzed for formaldehyde by the standard sodium sulfite procedure. The modified paraformaldehyde was found to dissolve to the extent of 14.4% when freshly prepared and still dissolved to the extent of 6.1% after sixty days. An unmodified control sample of polymer dissolved to the extent of 6.2% when freshly prepared and was only 2.3% soluble after sixty days' storage.

*Example II*

A charge of 3660 pounds of 45.4% formaldehyde to which was added 8.2 pounds of pentaerythritol was vacuum distilled at a pressure of 100 mm. to 140 mm. of mercury. In this way, approximately 1077 pounds of modified paraformaldehyde containing 96.6% formaldehyde was obtained. This material contained approximately 0.8% pentaerythritol and melted at a temperature of 122° C. to 128° C. The melting range of unmodified paraformaldehyde prepared in this way normally falls between 127° C. and 140° C. The solubility of the modified material in water, buffered to a pH of 4, as described in Example I, was 10.7%. After six days' storage, the solubility was still 10.7%. An unmodified batch of paraformaldehyde was found to have a solubility of 3.4% as freshly prepared, and this value fell to 1.2% after seven days' storage.

The pentaerythritol used in this invention may be either the commercial product which contains 10% to 15% or more of polypentaerythritols or chemically pure nitration grade pentaerythritol.

In the preparation of adhesives and other resinous products, paraformaldehyde is often used as a hardening agent. In such uses, the reactivity of the polymer is important. In some cases, a highly reactive paraformaldehyde is desired, whereas in other cases a product of low reactivity is more suitable. A particular case in which paraformaldehyde of high reactivity is desired is found in its use as a setting agent for cold press adhesives. In these uses, it is highly desirable to have a polymer showing a low degree of reactivity-loss on aging.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to these details except as set forth in the appended claims.

I claim:

1. Paraformaldehyde containing, as an agent for controlling and stabilizing polymer reactivity, 0.1% to 10% pentaerythritol.

2. Paraformaldehyde containing, as an agent for controlling and stabilizing polymer reactivity, 0.5% to 2.5% pentaerythritol.

3. The process of producing a modified paraformaldehyde having a high stability against increase in molecular weight which comprises adding pentaerythritol in an amount equivalent to 0.05% to 8.0% of the dissolved formaldehyde to an equeous solution of formaldehyde, and heating said solution under vacuum to remove water therefrom until said paraformaldehyde is formed.

4. The process of producing a modified paraformaldehyde having a high stability against increase in molecular weight which comprises adding pentaerythritol in an amount equivalent to 0.05% to 8.0% of the dissolved formaldehyde to a 30% to 50% aqueous solution of formaldehyde, and heating said solution under vacuum to remove water therefrom until said paraformaldehyde is formed.

5. The process of producing a modified paraformaldehyde having a high stability against increase in molecular weight which comprises adding pentaerythritol in an amount equivalent to 0.05% to 8.0% of the dissolved formaldehyde to an aqueous solution of formaldehyde, and converting said solution to paraformaldehyde by removal of water therefrom.

6. The process of producing a modified paraformaldehyde having a high stability against increase in molecular weight which comprises adding pentaerythritol in an amount equivalent to 0.05% to 8.0% of the dissolved formaldehyde to a 30% to 50% aqueous solution of formaldehyde, and heating said solution under a pressure not to exceed 150 mm. Hg. to remove water therefrom until said paraformaldehyde is formed.

JOSEPH FREDERIC WALKER.

REFERENCES CITED

The following references are of record in the file of this patent:

UNITED STATES PATENTS

| Number | Name | Date |
|---|---|---|
| 1,948,069 | Fuchs et al. | Feb. 20, 1934 |

(Other references on following page)

UNITED STATES PATENTS

| Number | Name | Date |
|---|---|---|
| 2,042,657 | Hinegardner | June 2, 1936 |
| 2,373,777 | Peterson | Apr. 17, 1945 |

FOREIGN PATENTS

| Number | Country | Date |
|---|---|---|
| 54,789 | Sweden | Dec. 6, 1921 |

OTHER REFERENCES

Walker: "Formaldehyde," page 44 (1940).